Patented July 31, 1951

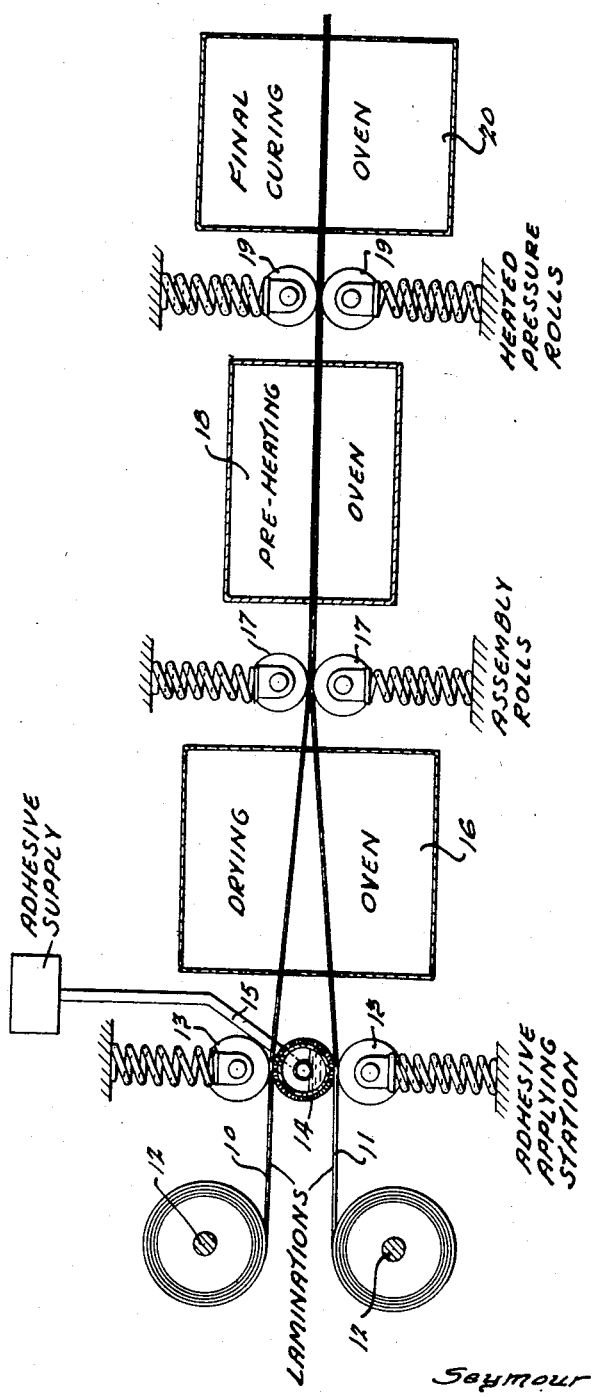

2,562,641

UNITED STATES PATENT OFFICE 2,562,641

METHOD OF FORMING LAMINATED ARTICLES

Seymour G. Saunders, Bloomfield Hills, Mich., assignor to Chrysler Corporation, Highland Park, Mich., a corporation of Delaware Application May 3, 1946, Serial No. 667,005

3 Claims. (Cl. 154—140)

This invention relates to improvements in the manufacture of articles which include layers or laminations of material secured together by a heat curable adhesive or cement.

More particularly, the invention relates to improvements directed to the curing of the adhesive in the manufacture of the above article.

Generally, the manufacture of an article of the foregoing type involves the application of pressure and heat, and an object of the invention is to apply these forces in a manner which minimizes the presence of internal stresses in the cured adhesive, and by the practice of a method which additionally permits use of apparatus having a relatively high output capacity due to minimizing the period during which the work is maintained under compression by such apparatus.

More particularly, the invention avoids the presence of internal stresses in the adhesive by permitting the same to undergo a major portion of the shrinkage incident to heat curing prior to the adhesive reaching a state of cure at which the laminations or layers of material are held in final fixed relationship by the adhesive; and in carrying out the foregoing the improvement effects a partial cure of the adhesive in the absence of pressure and at which time the major shrinkage of the adhesive occurs.

Another object of the invention is the provision of a method which effects the foregoing improvements and involves the use of simple and inexpensive apparatus so arranged as to provide a series of in-line stations at which successive operations are performed by continuous movement of the structural components thereby.

The invention may be employed in the assembly of component layers or laminations of the same or different materials having flat or otherwise contoured surfaces to be adhered together and in the case of components having flat surfaces, rolls are preferably employed to simultaneously apply pressure and the desired degree of temperature. The invention is particularly adapted for the curing of thermosetting resin type adhesives, but nevertheless the same may be employed in whole or in part in connection with the other heat curable adhesives or cements.

When the invention is employed in conjunction with a thermosetting adhesive or cement, for example the adhesive disclosed in Patent 2,376,854 of May 22, 1945, which may comprise an elastomer and either thermo-setting phenol aldehyde or urea aldehyde resins, a coating or film of such adhesive is applied by any suitable method to one or both of the prospective adjacent surfaces of the layers or laminations of material to be secured together. Any suitable heat curable adhesive may be employed. Generally such adhesives include a dispersion or solution of thermosetting resins or blends of such resins in a volatile vehicle or solvent. Phenol formaldehyde and urea formaldehyde are frequently used as the thermosetting resin content of cements of this character. After application of the adhesive, the vehicle or solvent thereof is removed or permitted to evaporate leaving the solids of the adhesive in a crust-like deposit or film on the surfaces of the parts which are to be bonded together. The thermosetting resin of the solids of the adhesive thus deposited are retained in uncured state at this stage of the process. The laminations are then brought into assembled relationship with the crust-like films of uncured adhesive between adjacent surfaces thereof and such assembly heated, before pressure is applied to force the surfaces together, to a temperature and for a time sufficient to bring the adhesive to an incipient state of cure or to cure it slightly but insufficient to effect the final cure thereof. Such temperature may be just above or practically at the higher limit of the curing range of the adhesive, and for a time so limited as to bring the latter to a readily flowable, plastic state. With the adhesive in this state the assembled layers are momentarily compressed together thereby bringing the layer surfaces and adhesive into intimate contact and simultaneously therewith the assembly is subjected to a temperature sufficient to at least continue curing of the adhesive but preferably of a degree insufficient to cause an appreciable expansion of the laminations beyond that resulting from the pre-heating in the absence of pressure. The adhesive undergoes the major portion of its shrinkage incident to curing during the pre-heat in the absence of pressure and substantially all such shrinkage has occurred when the momentary compression and heating operation has been effected. The aforesaid simultaneous heating and compression imparts sufficient strength to the adhesive to enable the latter to retain the layers or laminations in the positions to which they were compressed and final cure of the adhesive may be completed without the necessity of further compression of the layers.

Where layers or laminations of flat, regular surfaces are employed the aforesaid momentary simultaneous application of heat and pressure may be obtained by passing the assembly between heated pressure rolls. However, where the contour of the layers or laminations is not conducive to the use of rolls, the aforesaid heat and pressure may be momentarily applied by compressing the assembly by a heated platen or between heated platens of a press wherein the operation might be similar to a stamping operation employing a dwell of a few seconds on the compression stroke, thus simulating the unit pressure and heat application of the rolls. Layers or laminations of flat regular shape may be likewise heated in a press.

As a typical example of the aforesaid pre-heating operation employed in connection with the use of a thermosetting adhesive disclosed in Patent 2,376,854, it will be noted that at least one type thereof may be completely cured at a temperature from 300° F. to 325° F. for a period of fifteen minutes. In the performance of such pre-heating operation, the assembly would be subject to a temperature in a range of 325° F. to 335° F. for a limited period of time, for example one or two minutes, during which the adhesive would progressively pass from a solid state to a readily flowable, plastic state and thence into a state wherein the curing reaction sets in and progresses to a critical reaction stage. When in the latter stage the curing is further advanced by momentarily subjecting the adhesive to a temperature preferably within the pre-heating range above set out and simultaneously therewith the assembly is compressed to bring the component surfaces into intimate contact with the adhesive. This momentary application of a temperature is desirable to affect only a semi-final cure thereby and thereafter the cure is completed by application of heat and in the absence of pressure.

The single figure of the drawing illustrates one embodiment of apparatus for practicing the invention, it being understood that such apparatus may be modified in whole or in part to accommodate application of the method to other components having different surface contours and final assemblies other than those of the flat type. The components herein illustrated as laminations 10 and 11 may be of the same or different materials and each thereof may be wound on a rotatably supported spool 12 and fed between oppositely arranged spring pressed rolls 13. A brush 14 is arranged between the latter rolls and the adjacent surfaces of the laminations 10, 11 for applying to such surfaces a coating or film of adhesive, for example a thermosetting adhesive or cement disclosed in Patent 2,376,854 of May 22, 1945. Such adhesive may be supplied through a conduit 15 to the brush 14 under requisite pressure. From the adhesive applying station the laminations so coated move into an oven 16 wherein the volatile vehicle or solvent of the adhesive is removed by the application of heat, leaving the solids of the adhesive in a crust-like deposit or film on the surfaces of the laminations, it being understood that the thermosetting resin of the solids of the adhesive so deposited are in an uncured state at this stage.

As the laminations 10, 11 thus coated leave the oven 16, they pass between a pair of heated spring pressed rolls 17 to bring the adhesive to a "tacky" state and simultaneously therewith press the films of tacky adhesive together. However, the rolls 17 may be unheated and serve merely to bring the laminations together preparatory to heating as hereinafter set forth. With the laminations and adhesive thus conditioned the assembly moves into a heated station herein illustrated as an oven 18 wherein the assembly is exposed to a temperature for a time sufficient to bring the adhesive to a readily flowable, plastic state but insufficient to effect final cure of the adhesive. As before pointed out, one type of thermosetting adhesive disclosed in Patent 2,376,854 may be completely cured at a temperature from 300° F. to 325° F. for a period of fifteen minutes, and in the oven 18 the temperature employed would be in the range of 325° F. to 335° F. for approximately two minutes during which curing of the adhesive sets in and progresses to a critical reaction stage, in the absence of a compressive force. The temperature and time of heating at this heating station may be predetermined to bring the adhesive to a state of incipient cure or to pre-cure it slightly. The heating means employed at the oven station 18 should be one capable of controlling the temperature to a specific selected degree. One type of the adhesive comprises synthetic rubber selected from the group consisting of chloroprene polymers and butadiene acrylic nitrile copolymers and a thermosetting synthetic resin such as phenol formaldehyde resin, the synthetic rubber being preferably in the form of discrete particles dispersed in a continuous phase of the resin, the foregoing ingredients being thinned to a desired consistency by addition of a suitable volatile organic solvent.

From the oven 18 the assembly is passed between a pair of spring pressed, heated rolls 19 to so compress the assembly as to bring the adjacent surfaces into intimate contact with the adhesive and to simultaneously subject the adhesive to a temperature which will advance curing of the adhesive but which will not cause appreciable expansion of the laminations, particularly as the latter leave such rolls after application of pressure thereto. The adhesive has undergone substantial, if not its entire, shrinkage incident to curing thereof at the time the assembly leaves the rolls 19 and any subsequent appreciable expansion of the laminations would tend to induce material stresses in the adhesive and results generally in an irregular surface pattern for the assembly. To effectively eliminate such subsequent expansion and avoid the undesirable results thereof, the temperature at the rolls 19 preferably is within, and not appreciably above, the temperature range employed in the aforesaid example of pre-heating at the oven 18. Where at least one of the component laminations is metallic such lamination has a characteristic of maintaining by conduction the subjected temperature beyond the rolls 19 thus producing additional expansion after the application of pressure and final shrinkage of the cement. Therefore, the temperature at the rolls 19 should be so regulated as to avoid appreciable expansion after application of compression. Where, however, there is no appreciable problem of expansion of the laminations at the rolls 19, the above relationship of temperature at the oven 18 and rolls 19 may be varied. The pressure and heat treatment of the assembly between the rolls 19 may be relied upon to effect final cure of the adhesive. If desired, only partial curing of the adhesive may be effected while the assembly is under pressure between the rolls and the final cure may be conducted preferably in the absence of pressure in a suitable oven 20.

In practicing the invention the rolls 17 may be omitted and the laminations with the dried adhesive applied thereto may pass directly from the drying oven 16 to the oven 18 wherein the laminations in superimposed assembled relationship are progressively heated.

As a further modification, in some instances the adhesive may be applied to but one of the laminations and the latter assembled on a table or bench with the solidified adhesive between adjacent surfaces thereof and thence fed to the oven 18 as above.

The simultaneous application of pressure and relative heat to the adhesive while it is in a state of incipient cure or slightly pre-cured but still relatively flowable causes the component layers of the structure to be moved into intimate contact with each other and the further curing of the adhesive during this heating and compressing action strengthens the adhesive and the bond between the latter and the component parts of the assembly sufficiently to maintain the parts in the relative positions to which they have been compressed.

While in the drawing is shown apparatus for fabrication of an assembly of only two layers of material, it will be readily seen that a larger number of layers may be similarly combined together by simply duplicating the adhesive applying unit of the apparatus and feeding additional layers of material coated with adhesive through the oven 16 and between the rolls 17.

I claim:

1. The continuous method of making a laminated article composed of a plurality of superimposed layers of material adhesively bonded together comprising the successive steps of applying a film of thermo-setting, resinous adhesive, carried in a volatile solvent, to one or more of the adjacently disposed surfaces of the layers while the layers are in a separated relationship, subjecting the separated, adhesive coated, layers to a temperature, lower than that required to initiate curing of the adhesive, to remove the volatile adhesive solvent and to reduce the resinous adhesive film to a crust-like, uncured condition, assembling the adhesive coated layers with the said adjacently disposed surfaces in connected relationship prior to initiating curing of the resinous adhesive, applying heat to the connected layers in the absence of compressive forces directed thereagainst to advance the cure of the adhesive to a point approaching incipient cure, momentarily applying pressure to said layers to compress said layers together and simultaneously applying heat thereto to pass the adhesive through the state of incipient cure, relieving the pressure application to said layers and continuing the application of heat in the absence of pressure application to said layers to bring said adhesive to a state of final cure.

2. The continuous method of making a laminated article composed of a plurality of superimposed layers of material adhesively bonded together comprising the successive steps of applying a film of thermo-setting, resinous adhesive, carried in a volatile solvent, to one or more of the adjacently disposed surfaces of the layers while the layers are in a separated relationship, subjecting the separated, adhesive coated, layers to a temperature, lower than that required to initiate curing of the adhesive, to remove the volatile adhesive solvent and to reduce the resinous adhesive film to a crust-like, uncured condition, assembling the adhesive coated layers with the said adjacently disposed surfaces in connected relationship prior to initiating curing of the resinous adhesive, applying heat to the connected layers in the absence of compressive forces directed thereagainst to advance the cure of the adhesive to a point approaching incipient cure, and simultaneously subjecting said layers to heat and roller pressure to pass said adhesive through the state of incipient cure, relieving the pressure application to said layers and continuing the application of heat in the absence of pressure application to said layers to bring said adhesive to a state of final cure.

3. The continuous method of making a laminated article composed of a plurality of superimposed layers of material adhesively bonded together comprising the successive steps of applying a film of thermo-setting, resinous cement, carried in a volatile solvent, selected from the group of cements consisting of thermo-setting phenol-aldehyde and thermo-setting urea-aldehyde elastomer cements and various combinations thereof, to one or more of the adjacently disposed surfaces of the layers while the layers are in a separated relationship, subjecting the separated, adhesive coated, layers to a temperature, lower than that required to initiate curing of the adhesive, to remove the volatile adhesive solvent and to reduce the resinous adhesive film to a crust-like, uncured conditioin, assembling the adhesive coated layers with the said adjacently disposed surfaces in connected relationship prior to initiating curing of the resinous adhesive, applying heat to the connected layers in the absence of compressive forces directed thereagainst to advance the cure of the adhesive to a point approaching incipient cure, momentarily applying pressure to said layers to compress said layers together and simultaneously applying heat thereto to pass the adhesive through the state of incipient cure, relieving the pressure application to said layers and continuing the application of heat in the absence of pressure application to said layers to bring said adhesive to a state of final cure.

SEYMOUR G. SAUNDERS.

REFERENCES CITED

The following references are of record in the file of this patent:

UNITED STATES PATENTS

| Number | Name | Date |
| --- | --- | --- |
| 1,019,408 | Baekeland et al. | Mar. 5, 1912 |
| 2,092,502 | Ellis | Sept. 7, 1937 |
| 2,233,875 | Schmidt et al. | Mar. 4, 1941 |
| 2,235,682 | Hawley | Mar. 18, 1941 |
| 2,319,826 | Pellett | May 25, 1943 |
| 2,351,735 | Bake | June 20, 1944 |
| 2,406,680 | Hall | Aug. 27, 1946 |
| 2,433,965 | Upson | Jan. 6, 1948 |
| 2,442,422 | Loetscher | June 1, 1948 |
| 2,444,830 | Kellgren et al. | July 6, 1948 |